United States Patent [19]

Dugge et al.

[11] 4,082,365
[45] Apr. 4, 1978

[54] PNEUMATIC OUTLET OPERATING MECHANISM

[75] Inventors: Richard H. Dugge, St. Louis; Ronald D. Van Dyke, Florissant, both of Mo.

[73] Assignee: ACF Industries, Incorporated, New York, N.Y.

[21] Appl. No.: 793,494

[22] Filed: May 4, 1977

Related U.S. Application Data

[63] Continuation of Ser. No. 633,754, Nov. 20, 1975, abandoned.

[51] Int. Cl.² .............................................. B65G 53/52
[52] U.S. Cl. ...................................... 302/52; 81/90 C;
81/90 B; 192/67 R; 192/95; 222/505; 222/556
[58] Field of Search ....................... 302/52; 214/83.28;
192/67 R, 95; 222/505, 556; 81/58.3, 58.4, 90 R, 90 B, 90 C

[56] References Cited
U.S. PATENT DOCUMENTS

| | | | |
|---|---|---|---|
| 2,603,325 | 7/1952 | Pickard | 192/67 R |
| 3,354,757 | 11/1967 | Grimm et al. | 81/90 B |
| 3,778,114 | 12/1973 | Carney et al. | 302/52 |

*Primary Examiner*—Bruce H. Stoner, Jr.
*Assistant Examiner*—Jeffrey V. Nase
*Attorney, Agent, or Firm*—Henry W. Cummings

[57] ABSTRACT

A pneumatic outlet for a hopper is disclosed having a tubular conduit extending from at least one end of the outlet to which suction or air under pressure may be applied for unloading the outlet. The tubular conduit is rotatably mounted and is connected to an internal valve member whereby rotation of the tubular conduit actuates the valve member to control the flow of lading from the outlet. The tubular conduit has a cylindrical outer surface, and a hub having at least one handle extending therefrom is rotatably and axially slidable on the cylindrical surface. Clutch teeth are provided on the tubular conduit and on the hub member which interengage in one axial position of the hub and are disengaged in another axial position of the hub whereby when the teeth are engaged, the tubular conduit is connected to said hub and is rotated when said hub member is rotated by the handle, and when said teeth are disengaged, the hub is free to rotate without rotating the tubular conduit whereby the handle and hub may be re-positioned. A removable end cap in closed position covers one or more annular discharge connections provided on the tubular conduit, and locking members on the cap engage keepers on the outlet end wall to maintain the cap in the closed and locked position. An indexing arrangement is disclosed in which the cap can only assume the closed and locked position when the hub and handle are in proper position to rotate the valve. If the hub and handle are in proper position to rotate the valve, a protrusion on the cap engages a slot in the hub when the cap is applied over the discharge connections of the tubular conduit.

4 Claims, 8 Drawing Figures

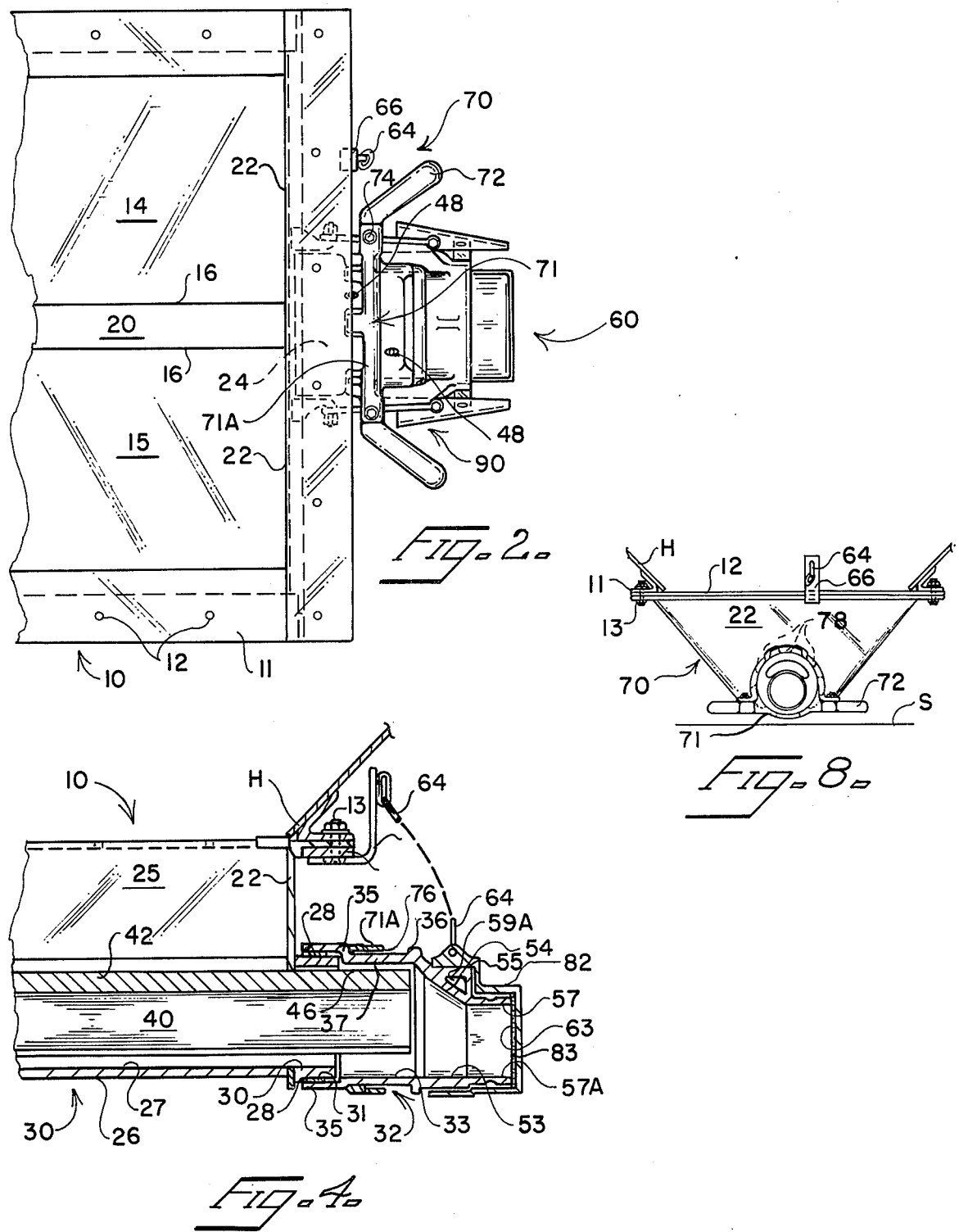

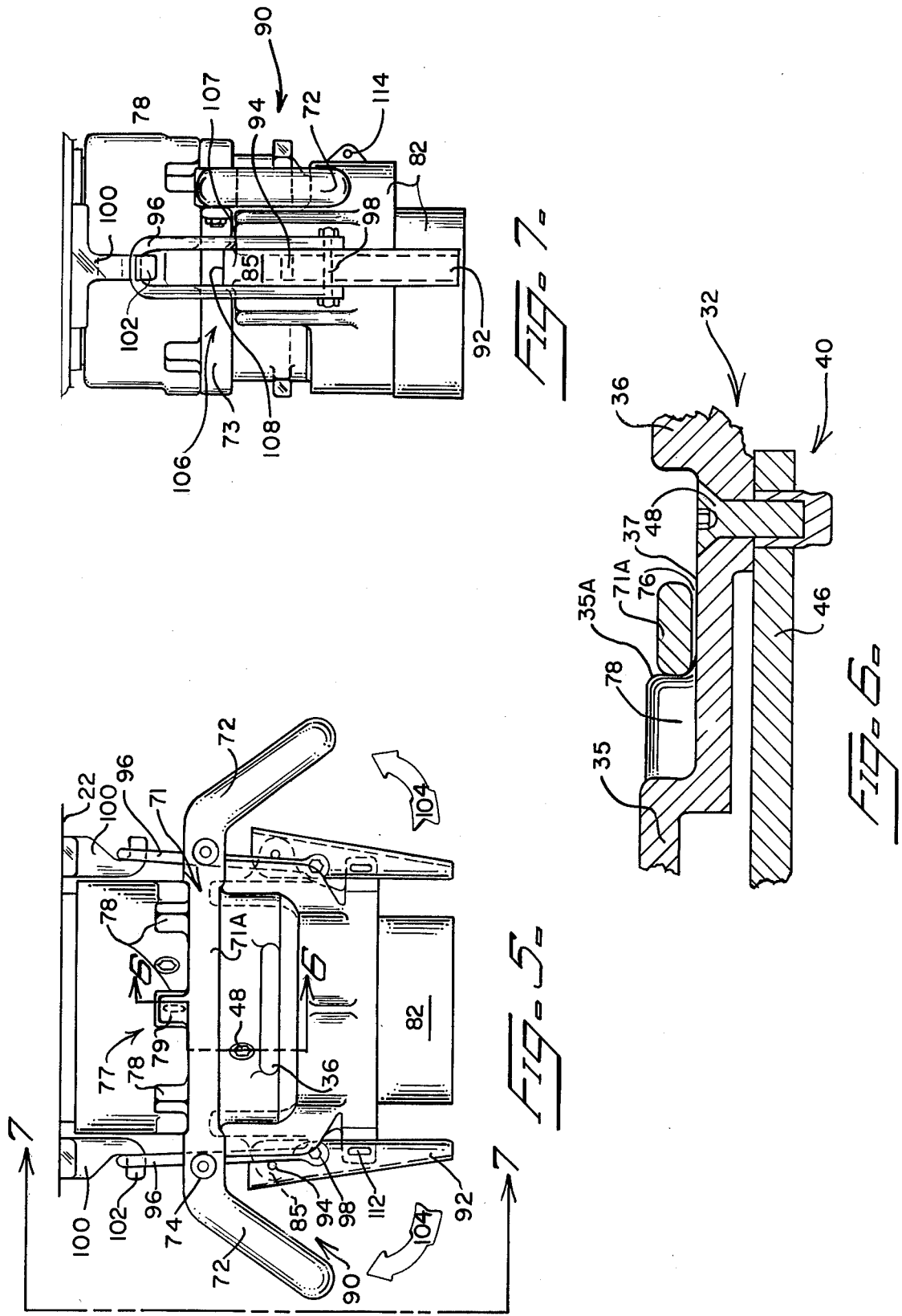

PNEUMATIC OUTLET OPERATING MECHANISM

This is a continuation, of application Ser. No. 633,754, filed Nov. 20, 1975 now abandoned.

BACKGROUND OF THE INVENTION

Pneumatic outlets have heretofore been provided having tubular discharge conduits which are rotatably mounted and connected to internal valve structure whereby rotation of the tubular discharge conduit will actuate the valve structure to control the flow of lading through the outlet. Such outlets have handles fixed to the tubular conduit to provide a mechanical advantage in rotating the tubular conduit to actuate the outlet valve. A pneumatic outlet of this type is shown and described in U.S. Pat. No. 3,778,114. Such outlets are satisfactory where there is sufficient clearance below the outlet to permit the handle to be moved a sufficient distance to operate the valve. Where, however, there is not such clearance, such an outlet cannot be properly operated.

SUMMARY OF THE INVENTION

The present invention provides a pneumatic outlet having a simple, relatively inexpensive mechanism for rotating the tubular discharge conduit of a pneumatic outlet to actuate the internal control valve thereof when there is very little clearance below the bottom of the outlet. The pneumatic outlet of the invention is particularly useful in connection with intermodal containers adapted to be transported on flat bed railway cars and trucks as well as the decks of ships which are designed to have as little as possible clearance with the bed or deck of the car, truck or deck.

In accordance with the invention, a hub member having at least one handle attached thereto is mounted for rotation and sliding axial movement on a cylindrical surface on the rotatable tubular discharge conduit of the outlet. Clutch means are provided between the hub and discharge conduit which are engaged when the hub is in one axial position whereby the hub and tubular discharge conduit are interconnected and the hub and tubular discharge conduit may be rotated by the handle to actuate the internal valve. When the handle approaches an obstruction, such as the bed of a car or truck, the clutch means may be disengaged by axial movement of the hub member to a second position whereby the hub is disconnected from the discharge conduit and is free to rotate on the tubular discharge conduit and the handle, and the hub may be repositioned and re-engaged with the discharge conduit so that the discharge conduit may be further rotated in the same direction.

A removable end cap in closed position covers one or more annular discharge connections provided on the tubular discharge conduit, and locking members on the cap engage keepers on the outlet end wall to maintain the cap in closed and locked position. Indexing means may be provided whereby the end cap cannot assume the closed position on the end of the tubular discharge conduit unless the hub and handle are in proper position to rotate the valve member. If the hub and handle are in proper position to rotate the valve, a protrusion on the cap will engage a slot in the hub when the cap is applied over the discharge connections of the tubular conduit.

THE DRAWINGS

FIG. 2 is a partial plan view of the outlet of the present invention;

FIG. 4 is a sectional view looking in the direction of the arrows along the line 4—4 in FIG. 3 with the cap in place;

FIG. 5 is an enlarged plan view of one end of the outlet illustrating the clutch arrangement and end cap locking arrangement in the outlet of the present invention;

FIG. 6 is a partial sectional view looking in the direction of the arrows along the line 6—6 in FIG. 2;

FIG. 7 is a view looking in the direction of the arrows along line 7—7 in FIG. 5;

FIG. 8 is a view similar to FIG. 3 in which the hub and handles are rotated to the down position illustrating the problem of interference when there is a lack of clearance between the handles and a surface below the outlet.

DESCRIPTION OF PREFERRED EMBODIMENTS

Figure 3:
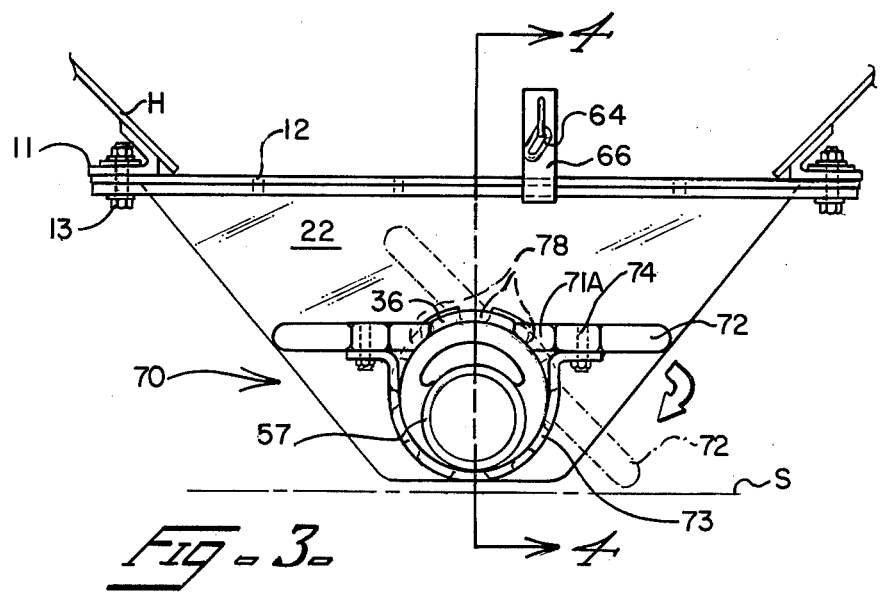
FIG. 3 is an end elevation view of the outlet shown in FIG. 2 with the end cap removed for clarity.

A pneumatic outlet incorporating the present invention is indicated in FIGS. 2-4 of the drawings generally at 10. The particular outlet 10 as shown is of the general type described in U.S. Pat. No. 3,778,114 and reference is made thereto for a more detailed description of the structure and operation theory. In the drawings, only one-half of the outlet 10 is shown, the other half being identical to the half shown. The outlet 10 includes a mounting flange 11 (FIG. 2) having suitable openings 12 to facilitate mounting the outlet on a suitable hopper frame H with fasteners 13 (FIGS. 3 and 4). Side walls 14 and 15 (FIG. 2) are inclined downwardly from the mounting flange, and the lower, inner edges 16 are spaced apart to define a longitudinally extending opening 20 in the outlet through which lading may pass. Connected to side walls 14 are vertical end walls 22, having respective openings therein 24.

A lower arcuate shaped housing or discharge trough indicated at 26 is secured to side walls 14 and 15 and end walls 22 and extends downwardly from edges 16 to provide a discharge trough for receiving lading passing through longitudinal opening 20. An interior chamber 25 is thus defined by side walls 14 and 15, end walls 22 and lower housing 26. An end ring 28 is secured to each end wall 22 around the openings 24 and the inner surface 30 of end ring 28 is flush with the inner surface 27 of lower housing 26 to form a smooth continuation thereof as shown particularly in FIG. 4. A bearing 31 is mounted on each end ring 28 and a tubular discharge conduit 32 is mounted for rotation on each bearing 31. Conduit 32 includes an enlarged portion 35 which rotates freely about the end ring 28 on the bearing 31.

Mounted for rotation within trough 26 is a discharge control valve indicated generally at 40. Control valve 40 includes a generally arcuate member 42 extending longitudinally within trough 26, and as described in U.S. Pat. No. 3,778,114, is so contoured as to in one position completely close off opening 20, and in other positions provide communication between the hopper and trough 26. Fasteners 48 (FIGS. 2, 5 and 6) are provided to integrally affix the conduits 32 to the ends 46 of the valve member 42 so that when conduit 32 is rotated, valve member 42 will rotate therewith, whereby valve member 42 may be rotated to a position allowing lading to pass through opening 20 into trough 26. Lading in the trough 26 may be removed by applying suction of air under pressure to the end of tubular conduit 32.

Discharge connections for receiving hose couplings of different diameters is the subject matter of copending Application Ser. No. 629,959 Filed Nov. 7, 1975 now U.S. Pat. No. 4,018,484 issued Apr. 19, 1977, assigned to the same assignee as the present application, and reference is made thereto for the details of the construction and function thereof. It is sufficient to an understanding of the present invention to note that tubular conduit 32 includes a first annular portion 54 having a cylindrical outer surface 55 for receiving a female hose coupling (normally for suction hose) of one diameter and a second annular portion 57 of smaller diameter projecting axially from the first annular portion 55 and having an outlet cylindrical surface 58 for receiving a female hose coupling of smaller diameter (normally for a pressure hose). The first and second annular portions 54 and 57 are eccentric with the inner surface 53 of annular portion 54 being tangent to the inner surface 57a of annular portion 57. When the tubular conduit 32 is in the position shown in FIG. 3 surfaces 33, 53 and 57a provide a smooth flow path for lading during clean-out of the outlet. Furthermore, the invention may be used with pneumatic outlet discharge connections of other types to which an unloading hose or adapter may be attached.

In accordance with the present invention a valve rotating assembly is provided for rotating tubular conduit 32 and valve member 40 when limited clearance exists below the bottom of the outlet.

Figure 1:
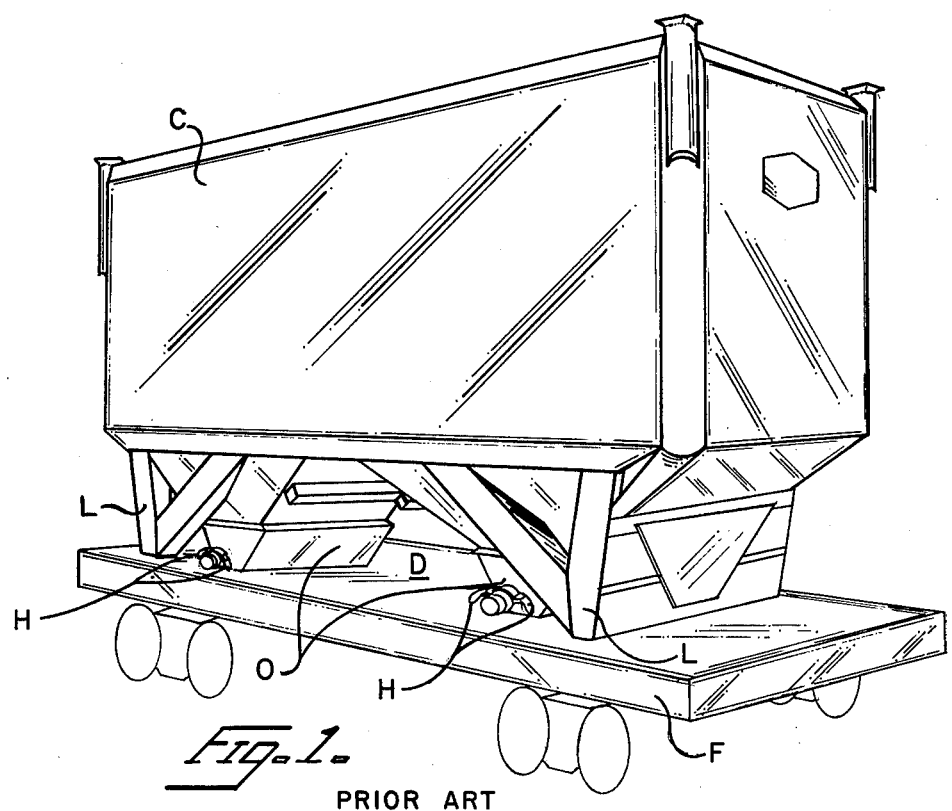
FIG. 1 is a schematic perspective view of a hopper type intermodal transit container mounted on a railway flat car illustrating the problem of interference in a prior art container outlet between handles utilized to rotate the outlet valve member and the railway flat car deck.

As illustrated in FIG. 1 of the drawings, one example of an application where the clearance problem exists is in a hopper type intermodal transit container C having supporting legs L mounted on a railway flat car F. When the operator attempts to unload the outlet O on the car by rotating the handles H on the outlet, interference occurs between the handles H and the flat car deck D. Similar interference problems occur when intermodal transit containers are mounted on flat bed overland trucks and on ship decks. In order to unload the outlet it is necessary to raise the container to provide sufficient clearance for the handles to rotate the valve member. A similar problem could occur in unloading a railway hopper car where there is limited clearance between the outlet and the ground or between the outlet and another surface below the outlet.

In accordance with the present invention a valve operating assembly 70 is provided for rotating the tubular conduit 32 and valve member 40 where limited clearance exists below the outlet.

Tubular conduit 32 is provided with a circumferential rim 36 which is spaced outwardly from tubular conduit enlarged portion 35. A cylindrical surface 37 of reduced cross section is provided therebetween. The valve operating assembly 70 includes a hub member 71 mounted for rotational and longitudinal movement on cylindrical surface 37. To facilitate the assembly of the hub 71 on the surface 37, the hub 71 is formed in two parts including an upper arcuate segment 71a having handles 72 extending outwardly therefrom, and a lower arcuate segment 73 attached to the upper arcuate segment 71a with fasteners 74. Clearance is provided as indicated at 76 to allow rotary and axial movement of hub 71 along the cylindrical surface 37. Operating assembly 70 includes a clutch arrangement 77. As shown in FIGS. 2 and 5, clutch arrangement 77 includes a plurality of clutch teeth 78 provided circumferentially in the outer edge 35a of enlarged conduit portion 35. Hub 71 is provided with a projecting tooth 79 appropriately dimensioned to engage between selected pairs of teeth 78.

To rotate conduit 32 and valve member 40, hub 71 is moved inwardly to allow tooth 79 to engage between selected teeth 78 and connect the hub 71 with the conduit 32. Handles 72 are then used to rotate conduit 32 and valve 40. As shown dotted in FIG. 3, when one of the handles 72 approaches the ground or supporting surface, which will prevent further rotation, hub 71 is first moved axially outwardly along cylindrical portion 37 to disengage tooth 79 from teeth 78. Circumferential rim 36 provides a stop for axial outward movement of hub 71. Hub 71 is then rotated relative to conduit 32, and moved axially inwardly to engage the tooth 79 between another pair of teeth 78 to allow further rotation of conduit 32 and valve 40. This procedure may be used to rotate valve 40 in either direction to unload both sides of the outlet.

A suitable removable cap 82 appropriately contoured to fit on discharge connection surfaces 55 and 57 is provided to close the outer end of conduit 32. A seal or gasket 83 is provided within the cap to effect a seal between the end of the tubular conduit 32 and the cap 82. Cap 82 is affixed to a chain 64 which preferably is affixed to a bracket 66 mounted on the outlet frame and prevents the cap 82 from getting lost or misplaced when the cap is removed while the outlet is being discharged.

Locking means to maintain the end cap 82 in closed and locked position when the outlet is not being discharged are indicated at 90 in the drawings. The locking means 90 includes locking handles 92 which are pivotally mounted on end cap flanges 85 (FIGS. 5 and 7) by means of fasteners 94. U-shaped locking members or hasps 96 are pivotally mounted on locking handles 92 by means of fasteners 98. A pair of keepers 100 are mounted on end wall 22. Keepers 100 have hook portions 102 which are engaged by locking members 96 when the cap is in closed position. To remove the cap for unloading, locking handles 92 are moved outwardly about fasteners 94 in the direction of arrows 104 in FIG. 5. This causes locking members 96 to move outwardly about fasteners 98 and out of engagement with hook portions 102 of keepers 100. Cap 82 can then be removed and hung on bracket 66 during unloading.

If desired, in accordance with another embodiment of the invention, indexing means indicated generally at 106 may be provided to insure that the operator rotates the hub into the proper position for rotating valve member prior to applying the cap 82. If the hub were rotated 180° from the position shown in solid lines in FIG. 3 and no indexing means were provided, the cap could be applied with the hub 71 and handles 72 in the down position (FIG. 8).

If at the unloading site the outlet were to be unloaded where limited clearance exists below the outlet, such as on a flat car deck, overland truck bed or a ship deck, the problem of handle interference with a surface S below the outlet in FIG. 8 would be present.

To avoid this problem, as shown in FIG. 7, indexing means 106 include a protrusion 107 provided on cap 82 which will engage a slot 108 in the ring 73 when the hub 71 has been rotated to the position shown in solid lines in FIG. 3 where there is sufficient clearance between the handles 72 and the surface S to rotate the valve member when tooth 79 engages between teeth 78. If the hub has not been rotated to the position shown in FIG. 3, protrusion 107 will not engage slot 108 and the cap cannot be applied axially inwardly sufficient for locking members 96 to engage hook portion 102 of keepers 100.

To secure end cap 82 in place in the closed position hub 71 is first rotated so that handles 72 are in the position as shown in solid lines in FIG. 3. Hub 71 is then moved axially inwardly so that tooth 79 is engaged between teeth 78. The cap 82 is then applied axially inwardly over discharge annular discharge connection surfaces 55 and 57, with protrusion 106 engaging slot 107 in ring 73. Locking members 96 are placed in engagement with hook portion 102 of keepers 100, and locking handles 92 are rotated in a direction opposite to arrows 104 until handles 92 attain the locked position shown in FIG. 5.

For railroad hopper car outlets a railway seal may be passed through openings 112 in handle 92 and 114 in cap 82 (FIGS. 5 and 7).

What is claimed is:

1. A pneumatic outlet comprising: side walls, end walls and a lower housing forming an interior chamber; a valve member mounted within the interior chamber for controlling the flow of lading from said outlet; a tubular conduit rotatably mounted on and extending from at least one end of said outlet and communicating at one end with the interior chamber; means interconnecting said valve member and said tubular conduit whereby rotation of the tubular conduit actuates the valve member to control the flow of lading from the outlet; said tubular conduit having a cylindrical outer surface; a hub member having at least one handle extending therefrom mounted for rotary and axially sliding movement on the cylindrical surface; clutch means on the tubular conduit and on the hub member which interengage in one axial position of the hub and disengage in another axial position of the hub whereby when the clutch means are engaged, the tubular member is connected to said hub and is rotated when said hub member is rotated by the handle, and when said clutch means are disengaged, the hub is free to rotate without rotating the tubular conduit whereby the handle and hub may be re-positioned; said conduit having at least one annular surface adapted to engage a hose coupling for discharging the outlet; a removable end cap in closed position covering said annular surface; locking means on said cap for maintaining said cap in closed position; and indexing means on said cap and said hub for insuring that when said cap is applied to the outlet said hub is in proper position for rotating said valve when limited clearance exists below said outlet.

2. A pneumatic outlet according to claim 1 wherein said indexing means comprise a protrusion on said cap which engages a slot in said hub when said handle is in proper position for rotating said valve.

3. An outlet according to claim 2 wherein said locking means comprises a locking handle pivotally mounted on said cap and a locking member affixed to said locking handle which engages a keeper mounted on said end when said cap is in closed and locked position.

4. An outlet according to claim 3 wherein said locking member is generally U-shaped and wherein said keeper includes a hook portion which engages said locking member when said cap is in closed and locked position.

* * * * *